(12) United States Patent
Kondo et al.

(10) Patent No.: US 8,651,742 B2
(45) Date of Patent: Feb. 18, 2014

(54) SLIDING BEARING

(75) Inventors: Masaru Kondo, Toyota (JP); Kenji Watanabe, Toyota (JP); Yukiyasu Taguchi, Toyota (JP)

(73) Assignee: Taiho Kogyo Co., Ltd., Toyota-shi, Aichi (JP)

( * ) Notice: Subject to any disclaimer, the term of this patent is extended or adjusted under 35 U.S.C. 154(b) by 0 days.

(21) Appl. No.: 13/387,938

(22) PCT Filed: Jul. 6, 2010

(86) PCT No.: PCT/JP2010/061438
§ 371 (c)(1),
(2), (4) Date: Jan. 30, 2012

(87) PCT Pub. No.: WO2011/013482
PCT Pub. Date: Feb. 3, 2011

(65) Prior Publication Data
US 2012/0148179 A1    Jun. 14, 2012

(30) Foreign Application Priority Data

Jul. 29, 2009 (JP) ................................. 2009-176523

(51) Int. Cl.
*F16C 33/10* (2006.01)
(52) U.S. Cl.
USPC .......................................... 384/288; 384/283

(58) Field of Classification Search
USPC ......... 384/288, 276, 283, 284, 286, 291, 292, 384/294, 429
See application file for complete search history.

(56) References Cited

U.S. PATENT DOCUMENTS 8,317,402 B2 * 11/2012 Ishigo et al. .................. 384/288

FOREIGN PATENT DOCUMENTS

| JP | 55-012180 | 1/1980 | | |
|---|---|---|---|---|
| JP | 58-046805 | 3/1983 | | |
| JP | 02-116028 | 9/1990 | | |
| JP | 05-202936 | 8/1993 | | |
| JP | 09144750 | * 6/1997 | ............. | F16C 17/03 |
| JP | 2007-225079 | 9/2007 | | |
| JP | 2008-082355 | 4/2008 | | |

OTHER PUBLICATIONS

International Search Report for PCT/JP2010/061438 (2 pages).

* cited by examiner

*Primary Examiner* — Thomas R Hannon
*Assistant Examiner* — Yamilka Pinero Medina
(74) *Attorney, Agent, or Firm* — Flynn, Thiel, Boutell & Tanis, P.C.

(57) ABSTRACT

A sliding bearing 1 is formed cylindrically of a pair of half bearings 11 and 12. A dust pocket 4 formed of a recess part is formed in the inner peripheral edges of joining surfaces 11A and 12A of the half bearings 11 and 12, and foreign-substance discharge grooves 5 and 5' are formed in a sliding surface 3 continuing from the dust pocket 4.

4 Claims, 6 Drawing Sheets

Fig. 7

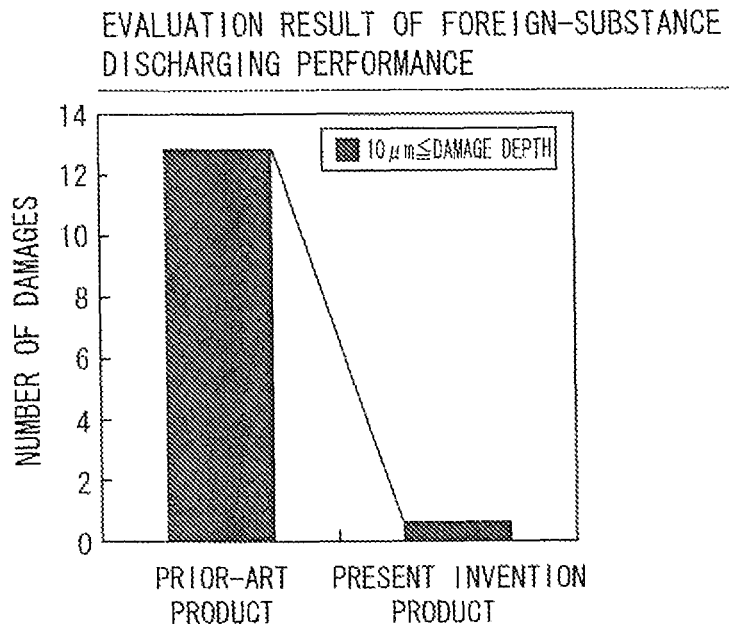

TEST CONDITIONS

- ENGINE MODEL : V6-3.5L
- TEST NAME : MOTORING PATTERN × 3 TIMES
- ROTATION NUMBER × LOAD : 500 TO 4000 RPM × NO LOAD
- TEST TIME : APPROXIMATELY 6 min
- OIL TYPE : 0W-20, OIL TEMPERATURE: AS IT IS
- WATER TEMPERATURE : AS IT IS
- TWO IRON FOREIGN SUBSTANCES (1.0 × 0.5 × t0.15) FOR ONE PIN ARE INPUTTED, AND THE NUMBER OF DAMAGES ON THE SURFACE OF THE BEARING IS EVALUATED.
- NUMBER OF DAMAGES IS TOTAL OF THE DAMAGES ON 3 CYLINDERS (6 IN TOTAL)

SLIDING BEARING

TECHNICAL FIELD

The invention relates to a sliding bearing and particularly to a sliding bearing configured cylindrically by a pair of half bearings abutted to each other.

BACKGROUND ART

A sliding bearing formed cylindrically by abutting a pair of half bearings to each other and provided with a chamfered part and a crush relief on an inner peripheral portion of a joining surface of each of the half bearings is known (See FIG. 6). In a sliding bearing provided with a crush relief such as a notch part, as illustrated in FIG. 6, when lubricant oil is supplied from an oil hole in a crank shaft, foreign substances mixed in the lubricant oil are caught by the crush relief and then discharged to the outside through the crush relief or openings on side parts on the chamfered part.

Sliding bearings in which foreign-substance discharge grooves are formed at required spots on a sliding surface in order to catch and discharge the foreign substances mixed in the lubricant oil to the outside have been proposed (See Patent Literatures 1 to 3, for example).

In the sliding bearing in Patent Literature 1, an oil groove is provided over the whole region in the circumferential direction on the sliding surface of the lower half bearing, and a pair of foreign-substance discharge grooves opened in the end faces in the axial direction of the half bearing is formed by branching the oil groove.

Also, the sliding bearing in Patent Literature 2 is formed by pivotally supporting a rotary shaft by a plurality of arc-shaped pads, a T-shaped groove for catching the foreign substances is formed on the sliding surface of each of the arc-shaped pads, and a magnet is installed on the bottom part of the axial grooves in a T-shaped groove. The magnet adsorbs and catches the foreign substances in the axial groove.

Moreover, in the sliding bearing in Patent Literature 3, a plurality of linear foreign-substance discharge grooves are formed in the axial direction in the vicinity of an joining surface in the lower half bearing.

PRIOR ART DOCUMENTS

Patent Literature

Patent Literature 1: Japanese Utility Model Laid-Open No. 02-116028
Patent Literature 2: Japanese Utility Model Laid-Open No. 58-046805
Patent Literature 3: Japanese Patent Laid-Open No. 05-202936

SUMMARY OF INVENTION

Problems to be Solved by the Invention

The sliding bearings disclosed in the above-described Patent Literatures 1 to 3 have the following problems, respectively.

That is, in the sliding bearing in Patent Literature 1, the oil groove is provided on the whole region in the circumferential direction on the sliding surface in the half bearing and the foreign-substance discharge groove is branched therefrom, and thus, the foreign substances can easily circulate through the oil groove, and it has defects that the foreign substances cannot be caught easily by the foreign-substance discharge groove, and the foreign substances cannot be efficiently discharged.

Also, in the sliding bearing in Patent Literature 2, since the T-shaped groove is formed at the center of the sliding surface in each of the arc-shaped pads, the area of the entire sliding surface is reduced, and such a problem is caused that a load capacity of the sliding bearing is reduced.

Moreover, in the sliding bearing in Patent Literature 3, since the plurality of axial grooves for discharging the foreign substances are formed only in the lower half bearing to which a load is applied, it has a defect that the foreign substances cannot be efficiently discharged.

Means for Solving the Problems

In view of the above-described circumstances, the present invention is, in a sliding bearing formed cylindrically by abutting joining surfaces of a pair of half bearings to each other and pivotally supporting a rotary shaft rotatably by a sliding surface composed by the inner peripheral surfaces of the half bearings, a dust pocket formed of a recess part is formed in the sliding surface which becomes an inner peripheral edge of the joining surface, and a foreign-substance discharge groove continuing from the dust pocket and opened in an end face in an axial direction in at least one of the half bearing is formed in the sliding surface at a position adjacent to the dust pocket.

Advantageous Effect of Invention

According to such a configuration, the foreign substances contained in the lubricant oil are first caught by the dust pocket and then discharged to the outside through the opening in the end face in the axial direction of the sliding bearing via the foreign-substance discharge groove communicating with the dust pocket. Therefore, as also obvious from a test result, which will be described later, a sliding bearing having better foreign-substance discharging performances than before can be provided.

BRIEF DESCRIPTION OF DRAWINGS

FIG. 7 is a diagram illustrating a test result and test conditions of foreign-substance discharging performances of the prior-art product illustrated in FIG. 6 and the present invention product illustrated in FIG. 5.

MODE FOR CARRYING OUT THE INVENTION

Figure 1:
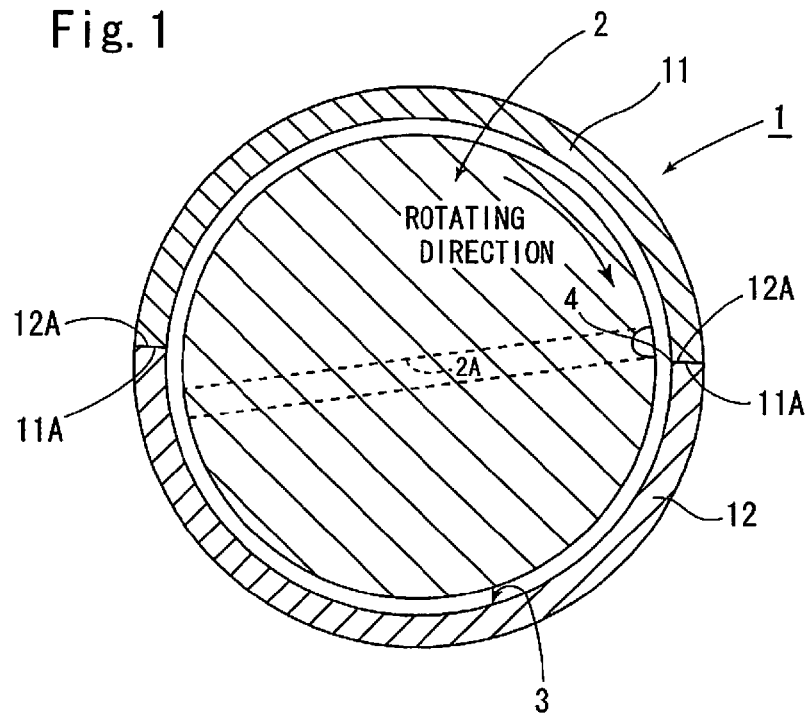
FIG. 1 is a sectional view of a sliding bearing and a crank pin illustrating an embodiment of the present invention.
Figure 2:
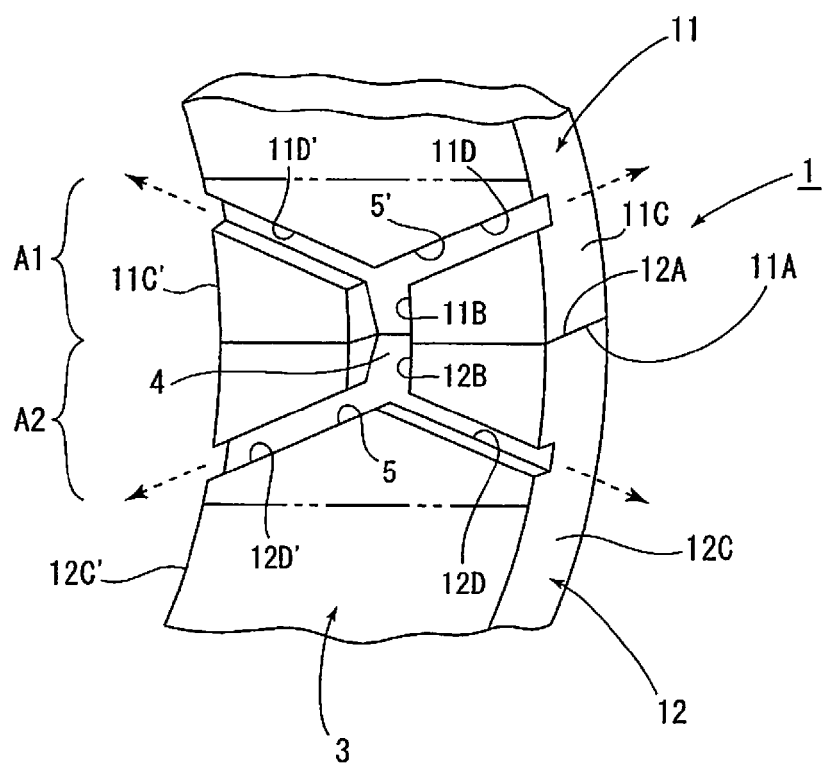
FIG. 2 is a perspective view of an essential part in the sliding bearing illustrated in FIG. 1 in an enlarged manner.

The present invention will be described below by referring to the illustrated embodiments. In FIGS. 1 and 2, reference numeral 1 denotes a sliding bearing provided in a con rod, not shown. This sliding bearing 1 is formed of an upper and lower pair of half bearings 11 and 12, each having a half cylindrical shape, and they are formed cylindrically as a whole by abutting joining surfaces 11A and 12A of both half bearings 11 and 12 to each other. This sliding bearing 1 pivotally supports a crank pin 2 (rotary shaft) of a crank shaft rotatably by a sliding surface 3 of each of the inner peripheral surfaces of the half bearings 11 and 12.

If lubricant oil is discharged from an oil pump, not shown, toward the crank shaft, the lubricant oil is supplied into a lubricant oil path, not shown, provided in the crank shaft and a lubrication hole 2A of the crank pin 2 connected thereto. Then, the lubricant oil supplied into this lubrication hole 2A is supplied to the sliding surface 3, which is the inner peripheral surface of each of the half bearings 11 and 12 with rotation in an arrow direction of the crank pin 2. As a result, the sliding surface 3 of the sliding bearing 1 is lubricated.

This embodiment is configured such that a dust pocket 4 which catches foreign substances is provided in the sliding surface 3 which becomes the inner peripheral edge of each of the joining surfaces 11A and 12A in the sliding bearing 1, and foreign-substance discharge grooves 5 and 5' are provided continuously from this dust pocket 4, and as a result, the foreign substances mixed in the lubricant oil can be discharged efficiently to the outside.

That is, as illustrated in FIG. 2, rectangular grooves 11B and 12B having the same dimension are formed continuously to each other at the center part in the axial direction of the inner peripheral edge of each of the joining surfaces 11A and 12A on one side of the sliding bearing 1 and the sliding surface 3 adjacent thereto, and the dust pocket 4 which catches the foreign substances by the recess part is formed of the rectangular grooves 11B and 12B in the continuous state.

As described above, in this embodiment, by forming the bearing cylindrically by abutting the joining surfaces 11A and 12A of the right and left sides of the upper and lower half bearings 11 and 12, the rectangular grooves 11B and 12B continuing to each other, the dust pocket 4 as a rectangular recess part is formed. Also, the dust pocket 4 is arranged at a position on the movement locus of the distal end of the lubrication hole 2A when the crank pin 2 is rotated. Thus, when the crank pin 2 is rotated in the arrow direction, the lubricant oil is directly supplied into the dust pocket 4 through the lubrication hole 2A. If the foreign substances 6 are mixed in the supplied lubricant oil, they are caught by the dust pocket 4 (See FIG. 3).

The width (the dimension in the axial direction) and depth of each of the rectangular grooves 11B and 12B which form the dust pocket 4 are set to such dimensions that can house the largest foreign substances 6 assumed in advance and let them pass.

Also, in the sliding surface 3 of the lower half bearing 12 adjacent to the dust pocket 4, two linear grooves 12D and 12D' are formed continuously extending from the lower end portion of the rectangular groove 12B forming the dust pocket 4 to each of end faces 12C and 12C' in each axial direction which become the both side faces and opened therein. The pair of linear grooves 12D and 12D' form the foreign-substance discharge groove 5 which discharges the foreign substances 6.

Each of the linear grooves 12D and 12D' forming the foreign-substance discharge groove 5 is arranged in the sliding surface 3 as follows. That is, both linear grooves 12D and 12D' are arranged with inclination with respect to the axis direction so that the end portions on the outward side opened in the axial end faces 12C and 12C' are located on the downstream side in the rotating direction of the crank pin 2 with respect to the end portions on the inward side connected to the end portion on the downstream side in the rotating direction of the crank pin 2 (the lower end portion in the rectangular groove 12B) in the dust pocket 4 (the rectangular groove 12B).

The widths and depths of the linear grooves 12D and 12D' are set to dimensions that the largest foreign substance 6 assumed in advance can pass therethrough with allowance.

Also, a foreign-substance discharge groove 5' on the upper side is formed in the sliding surface 3 vertically symmetrically with respect to the foreign-substance discharge groove 5 on the lower side having the inner peripheral edges of the upper and lower joining surfaces 11A and 12A between them.

This foreign-substance discharge groove 5' is formed of two linear grooves 11D and 11D' extending from the end portions on the upstream side in the rotating direction of the crank pin 2 (the upper end portion of the rectangular groove 11B) in the dust pocket 4 to both axial end faces 11C and 11C' and opened therein. These linear grooves 11D and 11D' are arranged such that the end portions on the outward side opened in the axial end faces 11C and 11C' from the end portions on the inward side which becomes a connection side with the dust pocket 4 are located on the upstream side in the rotating direction of the crank pin 2.

The widths and depths of the linear grooves 11D and 11D' are set to dimensions that the largest foreign substance 6 assumed in advance can pass therethrough with allowance.

As mentioned above, in the sliding bearing 1 of this embodiment, the dust pocket 4 is formed in the sliding surface 3 in the inner peripheral edges of the joining surfaces 11A and 12A of the upper and lower half bearings 11 and 12 and the sliding surface 3 at a position adjacent thereto, and the upper and lower two pairs of foreign-substance discharge grooves 5 and 5' continuing from them are formed. In short, in the sliding bearing 1 of this embodiment, in regions A1 and A2 of the inner peripheral surface on which a crush relief was formed in the prior-art known sliding bearing, the dust pocket 4 and the foreign-substance discharge grooves 5 and 5' are formed.

In the sliding bearing 1 configured as above, when the crank pin 2 is rotated in the arrow direction in FIG. 1, the lubricant oil is directly supplied into the dust pocket 4 from the lubrication hole 2A and then, the lubricant oil is discharged to the outside through the upper and lower foreign-substance discharge grooves 5 and 5'. At that time, as illustrated in the schematic diagram in FIG. 3, if the foreign substances 6 are contained in the lubricant oil, first, the foreign substances 6 are caught by the dust pocket 4 and then, the foreign substances 6 caught in the dust pocket 4 pass through the upper and lower foreign-substance discharge grooves 5 and 5' and are discharged to the outside of the sliding bearing 1 through the openings in the axial end faces 11C and 12C.

As described above, in this embodiment, by forming the dust pocket 4 in the inner peripheral edges of the joining surfaces 11A and 12A of the sliding bearing 1, the foreign substances 6 mixed in the lubricant oil can be efficiently caught, and moreover, the foreign substances 6 caught by the dust pocket 4 are discharged to the outside of the sliding bearing 1 efficiently through the foreign-substance discharge grooves 5 and 5'.

Also, in this embodiment, the foreign-substance discharge groove 5 formed in the lower half bearing 12 is arranged so that the end portion on the outward side is located closer to the downstream side in the rotating direction of the crank pin 2 than the end portion on the inward side. Thus, even if the lubrication hole 2A of the crank pin 2 does not communicate with the dust pocket 4, the flow of the lubricant to the lower side in the foreign-substance discharge groove 5 on the lower side is generated by the viscosity thereof with rotation of the crank pin 2, and thus, the foreign substances 6 in the dust pocket 4 are efficiently discharged to the outside through the foreign-substance discharge groove 5.

Moreover, since the foreign-substance discharge groove 5' is also formed on the upper side continuously from the dust pocket 4, the lubricant oil in the dust pocket 4 flows also through the foreign-substance discharge groove 5' on the upper side, and the foreign substances 6 in the dust pocket 4 is discharged to the outside more efficiently.

Figure 3:
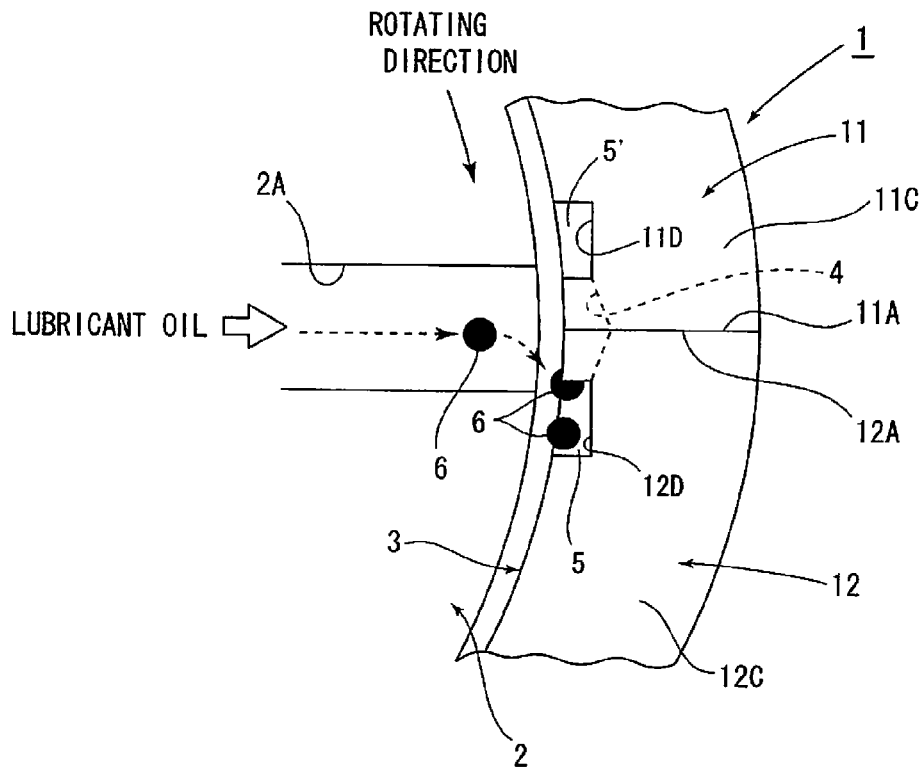
FIG. 3 is a schematic diagram illustrating a state in which lubricant oil containing foreign substances is supplied to the essential part in FIG. 1.

In this first embodiment illustrated in FIGS. 2 and 3, the foreign-substance discharge grooves 5 and 5' are provided at positions above and below the dust pocket 4, but the foreign-substance discharge groove 5' in the upper half bearing 11 and the rectangular groove 11B on the upper side forming the dust pocket 4 may be omitted. That is, in that case, the dust pocket 4 (rectangular groove 12B) and the foreign-substance discharge groove 5 continuing from that are formed only on the lower half bearing 12 side.

Figure 4:
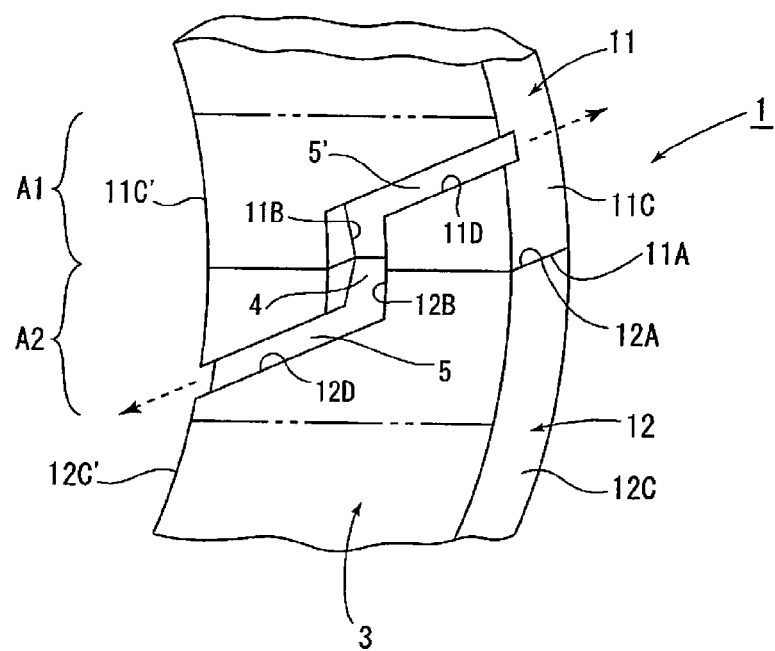
FIG. 4 is a perspective view of an essential part illustrating a second embodiment of the present invention.

Subsequently, FIG. 4 illustrates an essential part of the sliding bearing 1 as a second embodiment of the present invention. In the first embodiment, the foreign-substance discharge grooves 5 and 5' are formed by two pairs of the linear grooves 12D and 12D' (11D and 11D') continuing from the dust pocket 4, but in this second embodiment, the foreign-substance discharge grooves 5 and 5' are formed by one linear groove each, that is, the linear groove 11D and 12D, respectively. The linear groove 11D in the upper half bearing 11 is arranged with inclination so as to be opened in the one of the axial end faces, that is, the end face 11C, and the linear groove 12D in the lower half bearing 12 is arranged with inclination so as to be opened in the other axial end face, that is, the end face 12C'. The configuration of the dust pocket 4 is the same as that of the first embodiment.

With the sliding bearing 1 in the second embodiment as above, too, the same operations/effects as those of the first embodiment can be obtained. Also, in this second embodiment, since the total flow area of the foreign-substance discharge grooves 5 and 5' is smaller than that in the first embodiment, when the lubricant oil is supplied from the lubrication hole 2A of the crank pin 2 to the dust pocket 4, a discharge amount of the lubricant discharged to the outside through the foreign-substance discharge grooves 5 and 5' can be reduced than that in the first embodiment. That is, a leakage amount of the lubricant oil in the sliding bearing 1 can be suppressed.

Figure 5:
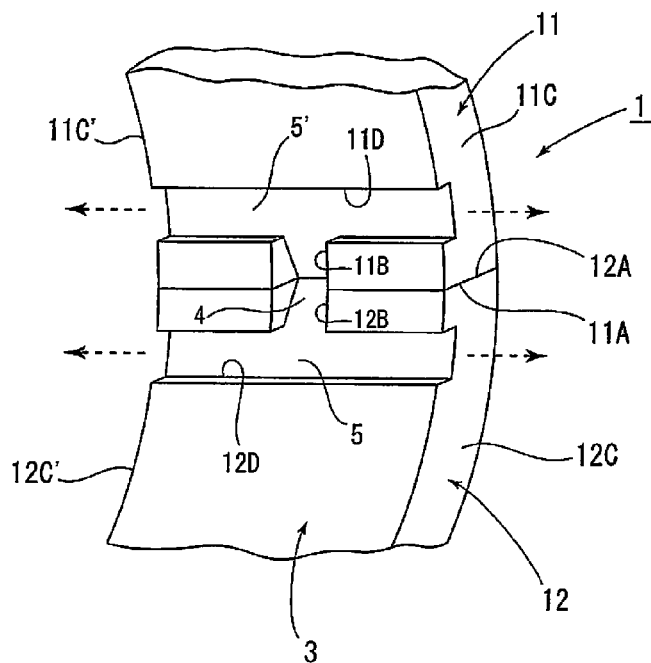
FIG. 5 is a perspective view of an essential part illustrating a third embodiment of the present invention.

Subsequently, FIG. 5 illustrates an essential part of the sliding bearing 1 as a third embodiment of the present invention. In this third embodiment, the foreign-substance discharge grooves 5 and 5' in the first embodiment are formed as a pair of linear grooves parallel with the axial direction of the sliding bearing 1. That is, the foreign-substance discharge grooves 5 and 5' are formed by each of the linear grooves 11D and 12D continuing from the upper end portion and the lower end portion of the dust pocket 4 and in parallel with the axial direction, respectively. The widths and depths of the foreign-substance discharge grooves 5 and 5' are set to the same dimensions. Also, the configuration of the dust pocket 4 is the same as that of the first embodiment. In this third embodiment, the foreign-substance discharge grooves 5 and 5' are formed in a direction orthogonal to the dust pocket 4, that is, in a direction orthogonal to the rotating direction of the crank pin 2.

In the third embodiment illustrated in this FIG. 5, the foreign-substance discharge grooves 5 and 5' are provided at the positions above and below the dust pocket 4, but the foreign-substance discharge groove 5' of the upper half bearing 11 and the rectangular groove 11B on the upper part forming the dust pocket 4 may be omitted. That is, in that case, the dust pocket 4 (the rectangular groove 12B) and the foreign-substance discharge groove 5 continuing from that are formed only on the lower half bearing 12 side.

Figure 6:
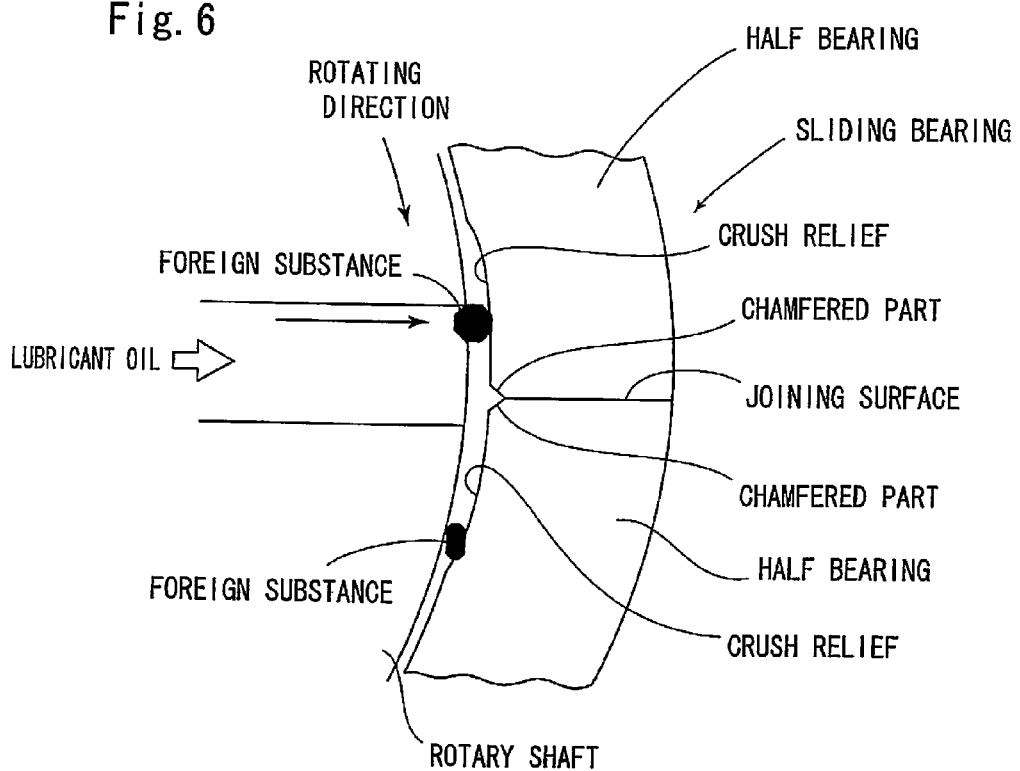
FIG. 6 is a front view illustrating an essential part of a prior-art sliding bearing.

Subsequently, FIG. 7 shows test results conducted on foreign-substance discharging performances of the sliding bearing 1 of the third embodiment illustrated in FIG. 5 and the prior-art sliding bearing provided with the crush relief and the chamfered part illustrated in FIG. 6. As described above, the prior-art known sliding bearing illustrated in FIG. 6 has a chamfered part formed on the inner peripheral edge of each of the joining surfaces of the both half bearings, and a crush relief formed of a notch part formed on the inner peripheral surface at a position adjacent to the chamfered part.

The test conditions are shown on the right side in FIG. 7. That is, two iron foreign substances (1.0 mm: *0.5 mm*t0.15 mm) having a predetermined dimension are inputted for one crank pin 1 in the lubricant oil to be supplied from the crank pin, and the lubricant oil is supplied to the sliding surface of the sliding bearing. The test result on the left side in FIG. 7 shows the result of the number of damages having the length of 10 μm or more generated on the sliding surface of the sliding bearing.

As can be understood from the test result in FIG. 7, 13 damages are generated in the sliding bearing in the prior-art product, while the number of damages in the sliding bearing 1 in the present invention product is less than 2. As described above, it can be understood that the foreign-substance discharging performances are much better in the sliding bearing of the present invention product illustrated in FIG. 5 than in the prior-art product.

Figure 8:
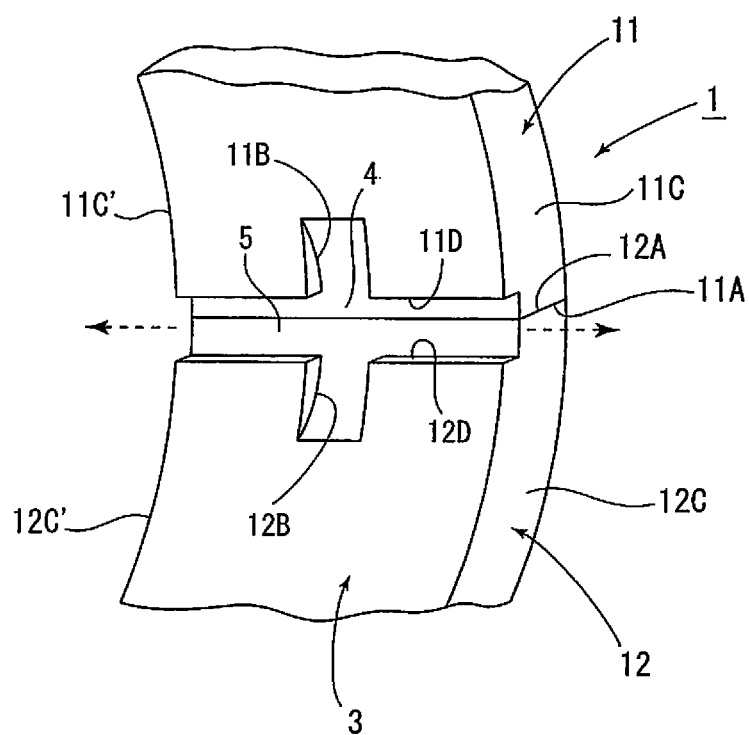
FIG. 8 is a perspective view of an essential part illustrating a fourth embodiment of the present invention.

Subsequently, FIG. 8 shows an essential part of the sliding bearing 1 as a fourth embodiment of the present invention. In this fourth embodiment, at the center part of each of the inner peripheral edges of the both joining surfaces 11A and 12A, the rectangular grooves 11B and 12B which gradually become deeper toward the sides of the joining surfaces 11A and 12A from the adjacent upper and lower positions are formed. These rectangular grooves 11B and 12B form the dust pocket 4. The notch parts 11D and 12D penetrating in the axial direction are formed in the inner peripheral edges of the joining surfaces 11A and 12A so as to be orthogonal to these rectangular grooves 11B and 12B. The linear foreign-substance discharge grooves 5 are formed by these notch parts 11D and 12D.

With the fourth embodiment as above, too, the same operations/effects as each of the above-described embodiments can be obtained.

Figure 9:
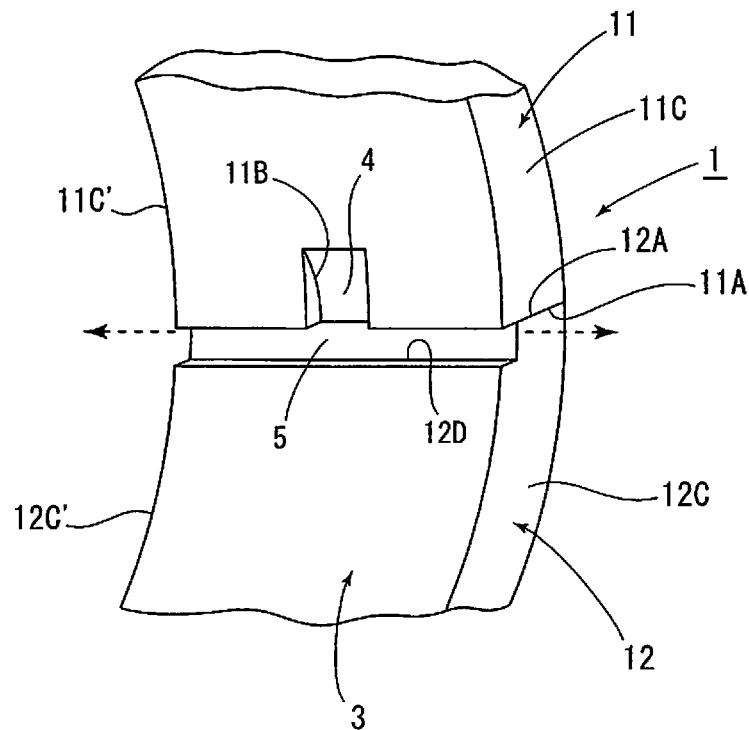
FIG. 9 is a perspective view of an essential part illustrating a fifth embodiment of the present invention.

Subsequently, FIG. 9 shows an essential part of the sliding bearing 1 as a fifth embodiment of the present invention. In this fifth embodiment, the rectangular groove 11B which gradually becomes deeper from the upper side toward the abutted 11A side is formed at the center part of the inner peripheral edge of the joining surface 11A in the upper half bearing 11 and a position adjacent thereto, whereby the dust pocket 4 is formed. Also, the notch part 12D penetrating in the axial direction is formed in the inner peripheral edge of the joining surface 12A of the lower half bearing 12, and the foreign-substance discharge groove 5 is formed by the linear groove formed of this notch part 12D and the joining surface 11A on the upper side.

With the fifth embodiment as above, too, the same operations/effects as each of the above-described embodiments can be obtained. The arrangement positions of the dust pocket 4 and the foreign-substance discharge groove 5 in this fifth embodiment may be vertically vice versa. That is, the dust pocket 4 (11B) may be formed in the inner peripheral edge of the joining surface 12A on the lower side and the notch part 12D in the axial direction may be formed in the inner peripheral edge of the joining surface 11A on the upper side.

Figure 10:
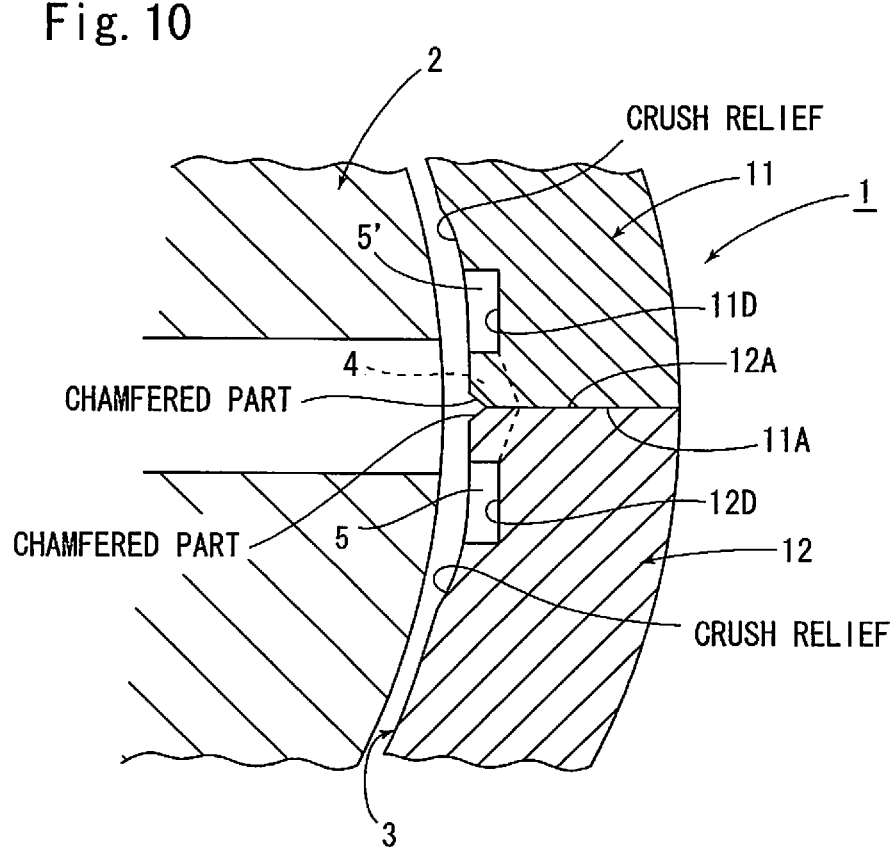
FIG. 10 is a front view of an essential part of another embodiment of the present invention.

Moreover, in each of the above-described embodiments, it is assumed that there is no crush relief at the position adjacent to the joining surfaces 11A and 12A of the half bearings 11 and 12, but as illustrated in FIG. 10, for example, the dust pocket 4 and the foreign-substance discharge grooves 5 and 5' as illustrated in each of the above-described embodiments may be formed in a region in which a crush relief is provided in the sliding bearing 3 provided with the chamfered part and the crush relief in the inner peripheral surface at the position adjacent to the joining surfaces 11A and 12A.

REFERENCE SIGNS LIST

1 sliding bearing
2 crank pin
2A lubrication hole
3 sliding surface
4 dust pocket
5, 5' foreign-substance discharge groove
6 foreign substance
11 half bearing
11A joining surface
12 half bearing
12A joining surface

The invention claimed is:

1. A sliding bearing formed cylindrically by abutting joining surfaces of a pair of half bearings to each other and pivotally supporting a rotary shaft rotatably by a sliding surface inner peripheral surface of both half bearings, wherein in an inner peripheral surface adjacent to an inner peripheral edge of each of the joining surfaces of the half bearings, a crush relief comprising a notch part is formed and a dust pocket is formed in each of the inner peripheral edges and comprises a pair of rectangular grooves which are formed in each of the inner peripheral edges of the joining surfaces and communicate with each other, and circumferentially extends from the inner peripheral edges of the joining surfaces and comprises a recess part and a foreign-substance discharge groove inclined in the axial direction relative to the axial direction of the half bearings and comprising a first linear groove extending from the dust pocket and opening in an end face in an axial direction in at least one of the half bearings and a second linear groove extending from the dust pocket and opening in an end face in an axial direction in at least one of the half bearings and located downstream of the first linear groove in a rotating direction of the rotary shaft.

2. The sliding bearing according to claim 1, wherein the second linear groove is arranged so that an end portion on an outward side opened in the end face in the axial direction is located downstream in the rotating direction of the rotary shaft of an end portion on an inward side.

3. The sliding bearing according to claim 1, wherein the dust pocket is provided at a position overlapping a movement locus of a lubrication hole provided in the rotary shaft when the rotary shaft is rotated.

4. A sliding bearing formed cylindrically by abutting surfaces of a pair of half bearings to each other and pivotally supporting a rotary shaft rotatably by a sliding surface inner peripheral surface of both half bearings, wherein in an inner peripheral surface adjacent to an inner peripheral edge of each of the joining surfaces of the half bearings, a crush relief comprising a notch part is formed and a dust pocket comprising a rectangular groove is formed in either inner peripheral edge and circumferentially extends therefrom and comprises a recess part and a foreign-substance discharge groove continuing from the dust pocket and opening in an end face in an axial direction in at least one of the half bearings are formed in a region where the crush relief is formed and the foreign substance discharge groove is inclined relative to the axial direction of the half bearings.

* * * * *